United States Patent
Reddy et al.

(10) Patent No.: US 10,050,870 B2
(45) Date of Patent: Aug. 14, 2018

(54) HANDLING MULTIPATH FLOWS IN SERVICE FUNCTION CHAINING

(71) Applicant: Cisco Technology, Inc., San Jose, CA (US)

(72) Inventors: K. Tirumaleswar Reddy, Bangalore (IN); Prashanth Patil, Mountain View, CA (US); Daniel G. Wing, San Jose, CA (US); James Neil Guichard, New Boston, NH (US)

(73) Assignee: Cisco Technology, Inc., San Jose, CA (US)

(*) Notice: Subject to any disclaimer, the term of this patent is extended or adjusted under 35 U.S.C. 154(b) by 215 days.

(21) Appl. No.: 15/013,027

(22) Filed: Feb. 2, 2016

(65) Prior Publication Data

US 2017/0222917 A1    Aug. 3, 2017

(51) Int. Cl.
*H04L 12/707* (2013.01)
*H04L 12/741* (2013.01)
*H04L 12/851* (2013.01)
*H04L 12/801* (2013.01)

(52) U.S. Cl.
CPC .............. *H04L 45/24* (2013.01); *H04L 45/74* (2013.01); *H04L 47/2441* (2013.01); *H04L 47/193* (2013.01)

(58) Field of Classification Search
CPC ......... H04L 45/00; H04L 45/24; H04L 45/74; H04L 47/2408; H04L 47/20; H04L 47/193; H04L 47/2441; H04L 47/24; H04L 47/125; H04L 47/2425
USPC ....................................................... 370/392
See application file for complete search history.

(56) References Cited

U.S. PATENT DOCUMENTS

| 7,417,989 | B1* | 8/2008 | Doran ..................... G06F 15/16 370/235 |
| 9,185,562 | B2 | 11/2015 | Reddy et al. |
| 2005/0129020 | A1* | 6/2005 | Doyle ..................... H04L 69/22 370/392 |
| 2006/0098573 | A1* | 5/2006 | Beer ................... H04L 12/2856 370/230 |
| 2014/0362682 | A1* | 12/2014 | Guichard ............ H04L 41/5038 370/221 |
| 2014/0362857 | A1* | 12/2014 | Guichard .............. H04L 45/566 370/392 |

(Continued)

OTHER PUBLICATIONS

M. Scharf et al., "Multipath TCP (MPTCP) Application Interface Considerations", Internet Engineering Task Force (IETF), ISSN: 2070-1721, Mar. 2013, 31 pages.

(Continued)

*Primary Examiner* — Michael Thier
*Assistant Examiner* — Rownak Islam
(74) *Attorney, Agent, or Firm* — Edell, Shapiro & Finnan, LLC

(57) ABSTRACT

A service classifier network device receives a subflow and identifies that the subflow is one of at least two subflows in a multipath data flow. Related data packets are sent from a source node to a destination node in the multipath data flow. The service classifier generates a multipath flow identifier and encapsulates the subflow with a header to produce an encapsulated first subflow. The header identifies a service function path and includes metadata with the multipath flow identifier.

20 Claims, 6 Drawing Sheets

(56) References Cited

U.S. PATENT DOCUMENTS

| | | | | |
|---|---|---|---|---|
| 2016/0112326 | A1* | 4/2016 | Farmanbar | H04L 47/18 |
| | | | | 370/230.1 |
| 2016/0218960 | A1* | 7/2016 | Sundarababu | H04L 45/08 |
| 2016/0234270 | A1* | 8/2016 | Wang | H04N 7/15 |
| 2016/0309534 | A1* | 10/2016 | Teyeb | H04L 69/14 |

OTHER PUBLICATIONS

J. Rosenberg, "Interactive Connectivity Establishment (ICE): A Protocol for Network Address Translator (NAT) Traversal for Offer/Answer Protocols" Internet Engineering Task Force (IETF), ISSN: 2070-1721, Apr. 2010, 117 pages.

J. Halpern et al., "Service Function Chaining (SFC) Architecture", Network Working Group, Internet-Draft, Feb. 17, 2015, 27 pages.

V. Singh et al., "Multipath RTP (MPRTP)", AVT Core Working Group, Internet-Draft, Dec. 20, 2014, 40 pages.

B. Briscoe, "Inner Space for TCP Options", TCP Maintenance and Minor Extensions (tcpm), Internet-Draft, Oct. 27, 2014, 49 pages.

J. Rosenberg et al., "Session Traversal Utilities for NAT (STUN)", Network Working Group, Oct. 2008, 51 pages.

A. Ford et al., "Architectural Guidelines for Multipath TCP Development", Internet Engineering Task Force (IETF), ISSN: 2070-1721, Mar. 2011, 28 pages.

\* cited by examiner

HANDLING MULTIPATH FLOWS IN SERVICE FUNCTION CHAINING

TECHNICAL FIELD

The present disclosure relates to applying service functions in computer networks for multipath data flows.

BACKGROUND

Service Function Chaining enables virtualized networking functions to be implemented as part of a cloud network. A Service Function Chain defines an ordered list of a plurality of service functions (e.g., firewall, compression, intrusion detection/prevention, load balancing, etc.) that may be applied to flows in the network. A flow enters the network through a classifier node that generates a Service Function Path for that flow according to the Service Function Chain policy. The Service Function Path indicates the service functions to which the flow will be subjected, and the order the service functions will be applied.

An application on a client device, such as a mobile device, may use multipath transport protocols to create multiple subflows using the available network paths between the client and a server. Alternatively, the operating system on the client device may initiate the multipath connection without direction from any specific application. For example, a mobile device may use both an available 3G interface and a WiFi™ interface to increase the bandwidth available to any application on the mobile device.

DESCRIPTION OF EXAMPLE EMBODIMENTS

Overview

Techniques are presented herein for receiving a first subflow among a plurality of subflows at a service classifier network device and identifying that the first subflow belongs to a multipath data flow. The multipath data flow comprises related data packets sent from a source node to a destination node over a plurality of network paths. A service classifier generates a multipath flow identifier and encapsulates the first subflow with a first header to produce an encapsulated first subflow. The first header identifies a service function path and includes metadata with the multipath flow identifier.

Example Embodiments

A mobile device using a multipath connection (e.g., MultiPath Transport Control Protocol (MPTCP) or Multipath Real Transport Protocol (MPRTP)) to a server splits application data into subflows between different source/destination address pairs. When the network traffic for the multipath data flow is directed over a cloud-based web security service function, i.e., a Security as a Service (SecaaS), a Service Function Forwarder (SFF) in the Service Function Path (SFP) may load balance the different subflows across multiple instances of a service function. If a service function instance does not receive all of the subflows in the multipath data flow, then the service function may lack the ability to perform application layer (e.g., Layer 7) operations on the multipath traffic.

The techniques presented herein enable the service classifier in the service function chain system to identify subflows associated with a multipath data flow and propagate multipath related metadata (e.g., in the Network Service Header (NSH)) to assist the network devices (e.g., service function forwarders) in correlating the subflows. The service function forwarders use the multipath metadata to redirect all of the subflows associated with a particular multipath data flow to the same instance of a service function. This also avoids any requirement of the service function forwarders to act as Transport Layer Security proxies.

Figure 1:
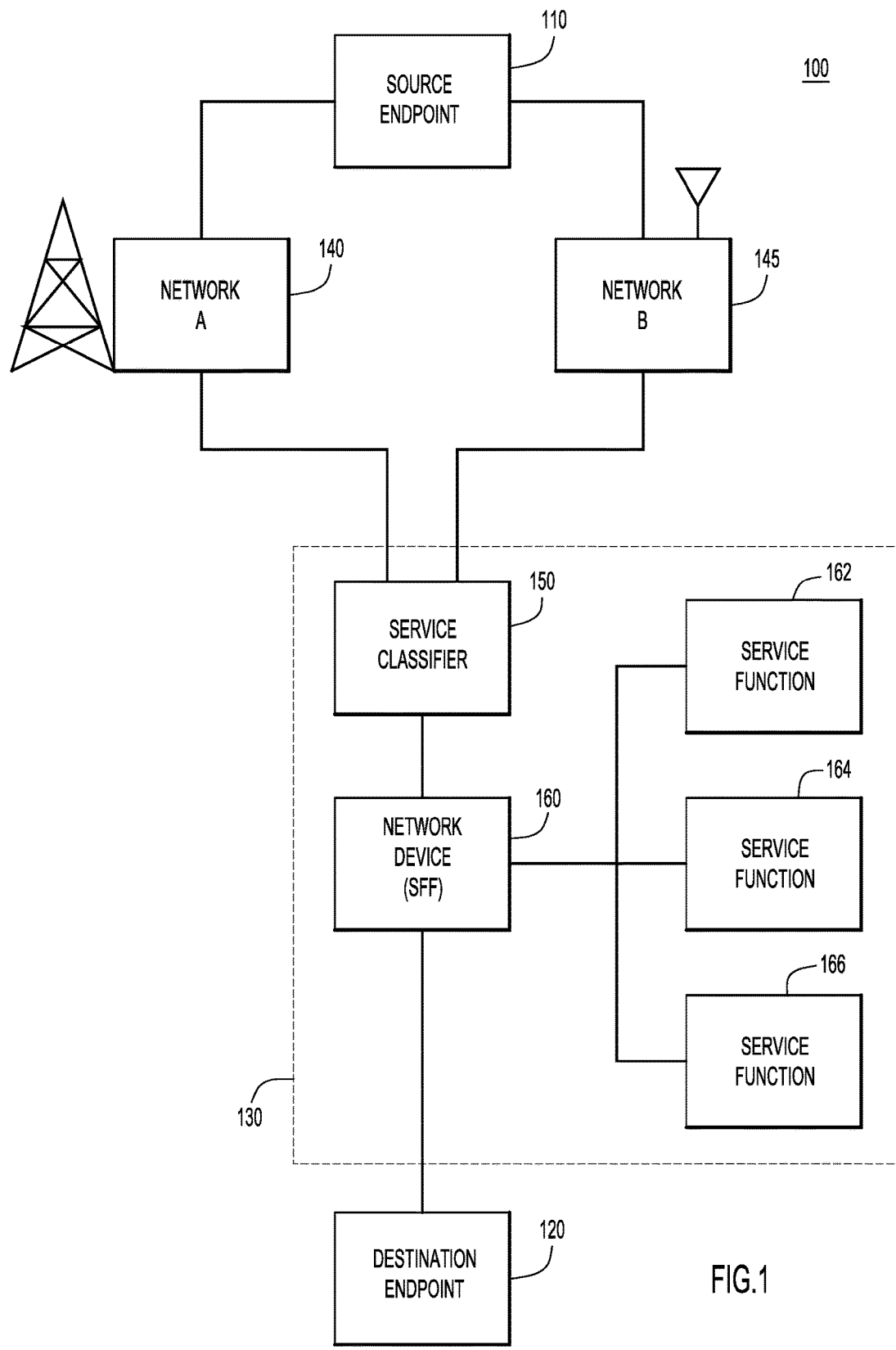
FIG. 1 is a system block diagram showing a network environment carrying a multipath flow through a Service Function Path according to an example embodiment.

Referring now to FIG. 1, a simplified block diagram of a multipath communication system 100 is shown. A source endpoint 110, such as a mobile device, communicates with a destination endpoint 120, such as a secure server. The communications between the source endpoint 110 and the destination endpoint 120 traverses a hosted service 130 at some point in the network path. In one example, the hosted service 130 may be a SecaaS that provides network security, e.g., for the destination endpoint 120. The hosted service 130 may be a cloud-based service.

The source endpoint 110 includes a plurality of network interfaces and may use a multipath transport protocol to route the traffic between the source endpoint 110 and the destination endpoint 120 over a plurality of different networks, such as cellular network 140 and wireless computer network 145. In one example, the source endpoint 110 is a mobile device, such as a smart phone or tablet computer, which includes both a cellular wireless interface to communicate over network 140 and a WiFi interface to communicate over network 145. While only two networks are shown in FIG. 1, any number of networks of varying types (e.g., wired, wireless, Ethernet, Fiber Channel, Bluetooth™, etc.) may be used with the techniques presented herein. Each network, e.g., network 140 and network 145, carries a corresponding subflow of the multipath data flow between the source endpoint 110 and the destination endpoint 120.

Each subflow enters the hosted service 130 at a service classifier 150, which encapsulates the subflow within the hosted service 130. In one example, the service classifier 150 may encapsulate the subflows with a Network Service Header that identifies a Service Function Path comprising an ordered list of one or more service functions that will act on the subflow. The encapsulated subflows are forwarded through one or more network devices 160, e.g., Service Function Forwarders, which forward the subflows to each of the service functions in the Service Function Path. The Service Function Forwarder 160 may forward the subflow to one of the service functions 162, 164, or 166. In one example, the service functions 162, 164, and 166 are instances of the same service function, and the Service Function Forwarder 160 determines which instance to send the subflow in order to balance the load across all of the instances.

In one example, the networks 140 and 145 may connect to the hosted service 130 directly through the service classifier network element 150. Alternatively, a cloud connector (not shown) outside the hosted service 130 may be in the network path between the networks 140 and 145 and the service classifier 150. FIG. 1 shows only two network elements (service classifier 150 and Service Function Forwarder 160), and three service functions. However, the hosted service system 130 may comprise any number of network elements and service functions providing services to any number of hosts using the techniques described herein.

Figure 2A:
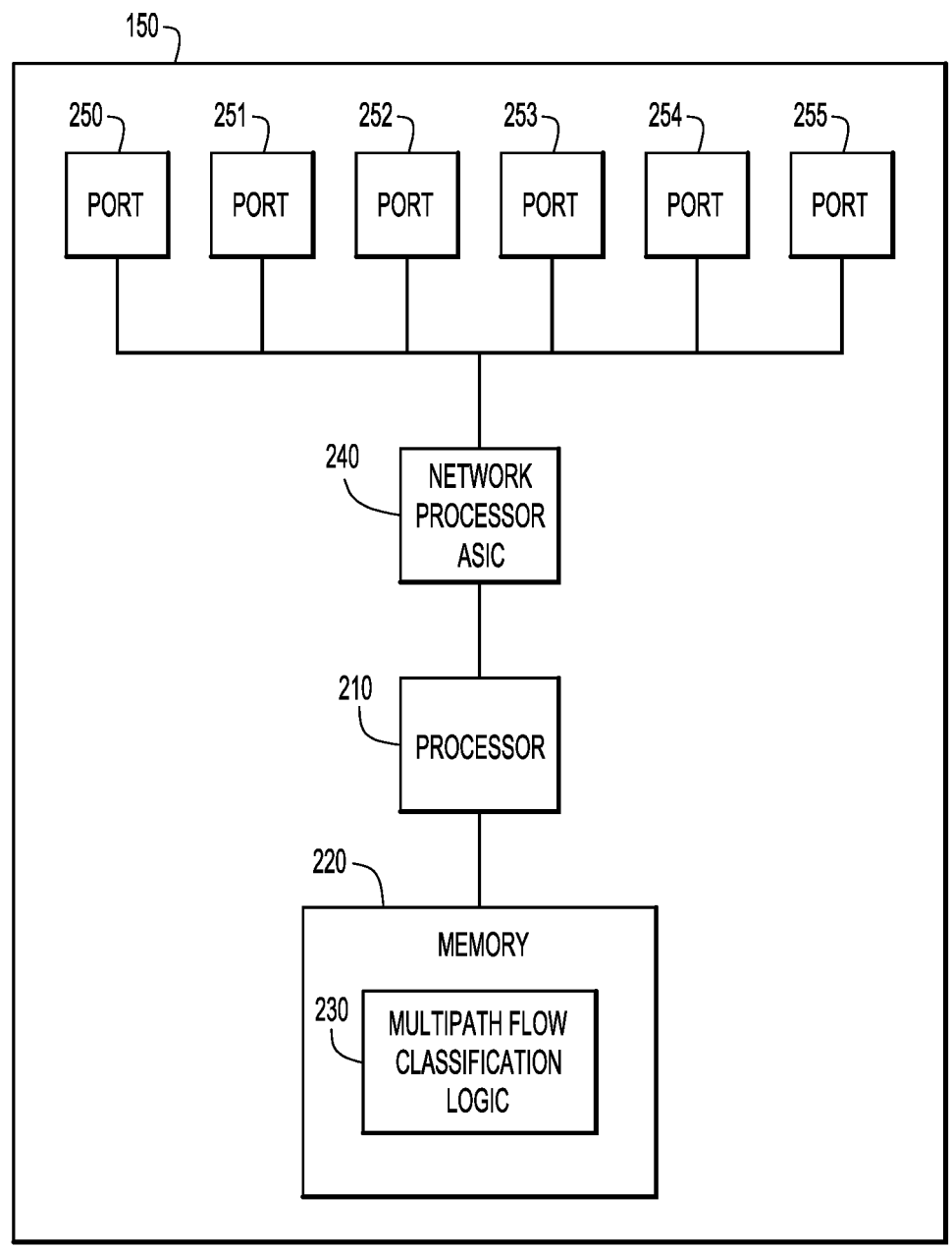
FIG. 2A is a simplified block diagram of a service classifier network device according to an example embodiment.

Referring now to FIG. 2A, a simplified block diagram of a service classifier network device 150 configured to perform the techniques presented herein is shown. Network device 150 includes, among other possible components, a processor 210 to process instructions relevant to processing communication packets in a Service Function Chain, and memory 220 to store a variety of data and software instructions (e.g., Multipath Flow Classification Logic 230, communication packets, etc.). The network device 150 also includes a network processor application specific integrated circuit (ASIC) 240 to process communication packets that flow through the network element 150. Network processor ASIC 240 processes communication packets be sent to and received from ports 250, 251, 252, 253, 254, and 255. While only six ports are shown in this example, any number of ports may be included in network element 150.

Memory 220 may include read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software (e.g., the multipath flow classification logic 235) is executed (by the processor 210) it is operable to perform the operations described herein.

Figure 2B:
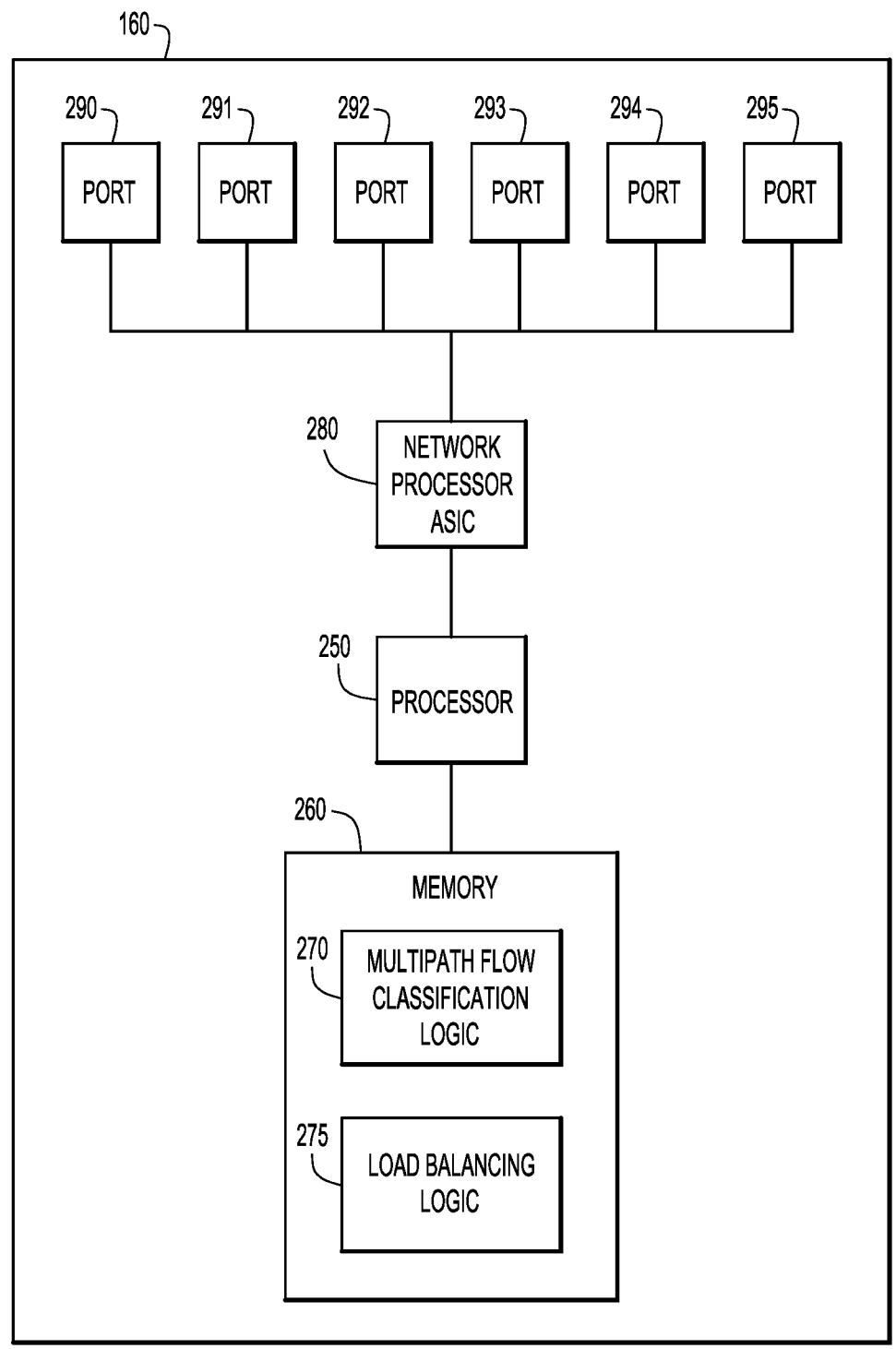
FIG. 2B is a simplified block diagram of a service function forwarder network device according to an example embodiment.

Referring now to FIG. 2B, a simplified block diagram of a service function forwarder network device 160 configured to perform the techniques presented herein is shown. Network device 160 includes, among other possible components, a processor 250 to process instructions relevant to processing communication packets in a Service Function Chain, and memory 260 to store a variety of data and software instructions (e.g., Multipath Service Function Forwarding logic 270, Load Balancing logic 275, communication packets, etc.). The network device 160 also includes a network processor application specific integrated circuit (ASIC) 280 to process communication packets that flow through the network element 160. Network processor ASIC 280 processes communication packets be sent to and received from ports 290, 291, 292, 293, 294, and 295. While only six ports are shown in this example, any number of ports may be included in network element 160.

Memory 260 may include read only memory (ROM), random access memory (RAM), magnetic disk storage media devices, optical storage media devices, flash memory devices, electrical, optical, or other physical/tangible (e.g., non-transitory) memory storage devices. The processor 250 is, for example, a microprocessor or microcontroller that executes instructions for implementing the processes described herein. Thus, in general, the memory 260 may comprise one or more tangible (non-transitory) computer readable storage media (e.g., a memory device) encoded with software comprising computer executable instructions and when the software (e.g., the multipath service function forwarding logic 270, the load balancing logic 275, etc.) is executed (by the processor 250) it is operable to perform the operations described herein.

Figure 3:
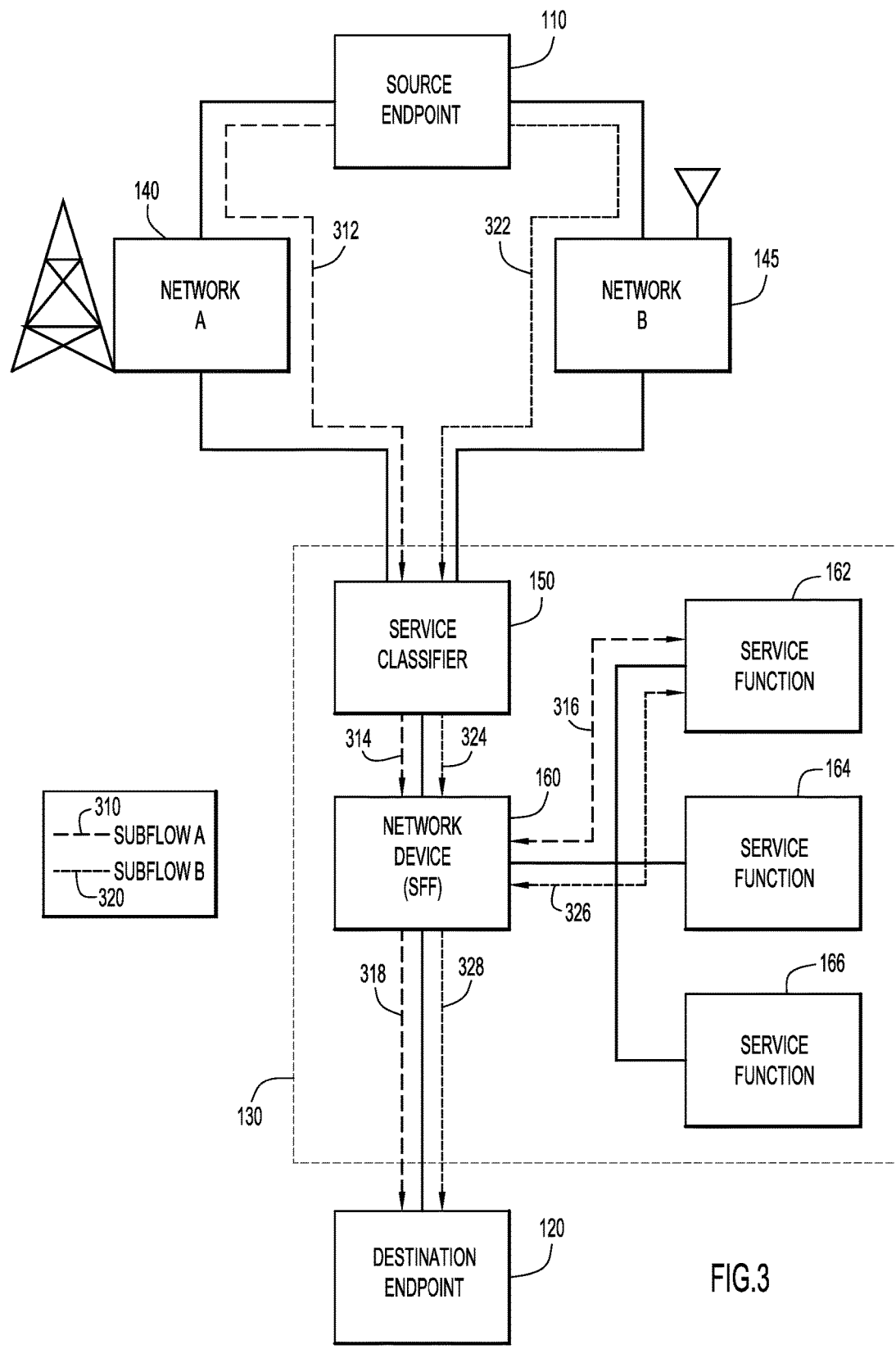
FIG. 3 is a system block diagram showing two subflows of a multipath data flow being directed to the same instance of a service function according to an example embodiment.

Referring now to FIG. 3, a simplified block diagram shows an example of the path of two subflows in a multipath data flow. The source endpoint 110 sends a first subflow 310 and a second subflow 320 to the destination endpoint 120 through interfaces to the cellular network 140 and the wireless computer network 145, respectively. Subflow 310 comprises portions 312, 314, 316, and 318, and subflow 320 comprises portions 322, 324, 326, and 328, depending on the devices sending/receiving the particular portion of the subflows 310 and 320 along the network path between the source endpoint 110 and the destination endpoint 120.

Initially, the subflow 310 traverses the network 140 as subflow 312 until it enters the hosted service 130. The service classifier 150 receives the subflow 312 and encapsulates it with a Network Service Header. The service classifier 150 determines that the subflow 312 is part of a multipath data flow and inserts a multipath flow identifier in the metadata of the Network Service Header. The service classifier 150 sends the encapsulated subflow 314 to the appropriate Service Function Forwarder 160 in the Service Function Path. The Service Function Forwarder 160 determines that instance 162 will provide the service function to the subflow and forwards subflow 316 to instance 162. After the instance 162 of the service function returns the subflow 316, the Service Function Forwarder 160 removes the encapsulation and forwards subflow 318 to the destination endpoint 120.

The source endpoint 110 also sends a second subflow 320 to the destination endpoint 120 through an interface to the wireless computer network 145. Initially, the subflow 320 traverses the network 145 as subflow 322 until it enters the hosted service 130. The service classifier 150 receives the subflow 322 and encapsulates it with a Network Service Header. The service classifier 150 determines that the subflow 322 is part of a multipath data flow and inserts a multipath flow identifier in the metadata of the Network Service Header. Since the subflow 322 is part of the same multipath flow as subflow 312, the service classifier 150 inserts that same multipath flow identifier in both Network Service Headers.

The service classifier 150 sends the encapsulated subflow 324 to the appropriate Service Function Forwarder 160 in the Service Function Path. The Service Function Forwarder 160 reads the multipath flow identifier in the Network Service Header and forwards subflow 326 to the same instance 162 as the earlier subflow 316. After the instance 162 of the service function returns the subflow 326, the Service Function Forwarder 160 removes the encapsulation and forwards subflow 328 to the destination endpoint 120.

In one example, the Service Function Forwarder 160 may load balance the first subflow 310 across all of the instances of the service function. However, the Service Function Forwarder 160 will send any subsequent subflow with the same multipath flow identifier (e.g., subflow 320) to the same instance of the service function as the initial subflow 310, regardless of load balance.

In another example, the multipath data flow is a MultiPath Transport Control Protocol (MPTCP) flow. The service classifier 150 may learn and store Internet Protocol (IP) address of a particular user. The IP addresses of trusted interfaces may be discovered using active authentication or from an Identity Service Engine (ISE). Additionally, the service classifier 150 may learn the IP address for untrusted interfaces as being assigned by the hosted service 130 itself, e.g., through a remote access virtual private network. When the service classifier 150 receives a TCP flow which is designated with an MP_CAPABLE option, the service classifier 150 records the keys and cryptographic hash algorithm exchanged by both endpoints for the flow.

After recording the keys, the service classifier 150 may generate a token based on the key of the receiver (e.g., destination endpoint 120) and store the token in a record of all of the IP addresses associated with a user. The token may then be used to identify the MPTCP connection and may be a cryptographic hash of the receiver's key that is exchanged in the MP_CAPABLE handshake. This token, which may be static for a specific MPTCP connection, may be used to identify any subflows that are initiated by the client (e.g., source endpoint 110) for this particular connection. TCP options may be tunneled within the TCP data, and the service classifier 150 would function as a Transport Layer Security (TLS) proxy to inspect the payload and identify whether it is an MPTCP connection or not.

In one example, the token generated as a cryptographic hash of the receiver's key may be used as a multipath flow identifier. Alternatively, the service classifier 150 may use another sufficiently unique identifier (e.g., a 32-bit random number identifier) for the multipath flow identifier and associate the identifier with the MPTCP connection. The service classifier 150 includes the multipath flow identifier and an MPTCP protocol identifier in the Network Service Header to indicate to all of the service functions in the Service Function Path that this is an initial subflow of the MPTCP connection.

When the service classifier 150 receives a subsequent TCP flow with an MP_JOIN option, it correlates the token in the MP_JOIN option with the token stored earlier to associate the subsequent flow with the initial subflow. The service classifier 150 selects the corresponding multipath flow identifier and conveys the multipath flow identifier and MPTCP protocol identifier in the Network Service Header of the subsequent flow. This indicates to all of the service functions in the Service Function Path that this subsequent subflow is associated with the initial subflow. The Service Function Forwarder 160 uses the metadata in the Network Service Headers to forward the MPTCP subflows within the same MPTCP connection to the same instance of a service function.

In another example, the multipath data flow may be a MultiPath Real Transport Protocol (MPRTP) flow or a MultiPath Real Transport Control Protocol (MPRTCP) flow. Service functions in a Service Function Path may be interested in MPRTP traffic for performance analytics (e.g., loss, delay, jitter, etc.). MPRTP and MPRTCP subflows associated with a media stream may be identified to ensure that the same instance of a service function receives all of the subflows in the media stream.

Similar to the case for MPTCP flows, the service classifier 150 may learn and store Internet Protocol (IP) address of a particular user. The IP addresses of trusted interfaces may be discovered using active authentication or from an Identity Service Engine (ISE). Additionally, the service classifier 150 may learn the IP address for untrusted interfaces as being assigned by the hosted service 130 itself, e.g., through a remote access virtual private network.

For MPRTP/MPRTCP traffic the service classifier may record the username in the Session Traversal Utilities for Network Address Translation (STUN) binding request from multiple IP addresses on the source endpoint 110 during Interactive Connectivity Establishment (ICE) connectivity checks. The service classifier 150 identifies MPRTP and MPRTCP subflows using RTP and RTCP header extensions. In one example, MPRTP subflows originating from the source endpoint 110 having matching username values in the ICE/STUN requests and matching Synchronization Source (SSRC) value in the RTP headers may be identified as MPRTP subflows associated with the same media stream.

The MPRTP metadata conveyed in the Network Service Header by the service classifier 150 may include an MPRTP/MPRTCP identifier and a flow identifier (e.g., a 32-bit identifier) to correlate MPRTP subflows associated with the media streams. As with the MPTCP traffic, the Service Function Forwarder 160 may use the metadata in the Network Service Header to forward MPRTP subflows associated with the same media stream to the same instance of a service function.

As long as all subflows from the source endpoints aggregate at the same service classifier 150, the service classifier 150 can handle potential collisions between different subflows using the same token (for MPTCP traffic) or SSRC (for MPRTP traffic). Since the service classifier 150 records the IP addresses of the source endpoints, different MPTCP connections from multiple users that use the same token based on the same destination endpoint key are distinguishable. Similarly, the service classifier 150 can handle collisions between different MPTRP connections from multiple users using the same SSRC based on the stored IP addresses.

Figure 4:
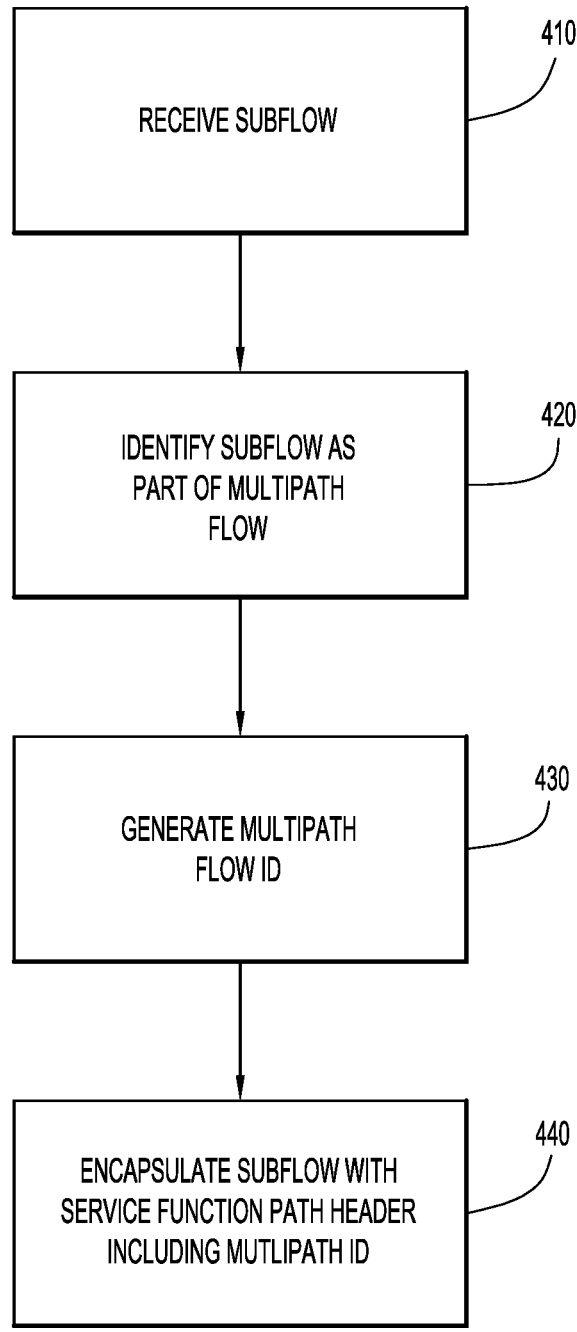
FIG. 4 is a flowchart showing the operations of a classifier network device processing a subflow of a multipath data flow according to an example embodiment.

Referring now to FIG. 4, a flowchart is shown for a process 400 in which a classifier node (e.g., service classifier 150) processes a subflow in a multipath data flow according to one example. In step 410, the classifier node receives a subflow of data from a source endpoint. The subflow may be received through a cloud connector of an enterprise network. In step 420, the classifier node identifies the subflow as part of a multipath data flow. The multipath data flow comprises related data flows that traverse a plurality of network paths between the source node and destination node. The subflow may be a TCP data flow with a MP-CAPABLE option designating that it is part of a MPTCP connection.

In step 430, the classifier node generates a multipath flow identifier associated with the multipath data flow. In one example, the multipath flow identifier may be related to metadata within the subflow, such as a key used in the setup of the multipath flow or a STUN username and SSRC value. In another example, the classifier node generates a unique identifier and stores a record of the unique identifier in association with metadata for the subflow. In step 440, the classifier node encapsulates the subflow with a header that identifies a service function path. The classifier node includes the multipath flow identifier in the metadata of the header to signal to the network elements in the service function path that the subflow is part of a specific multipath data flow.

Figure 5:
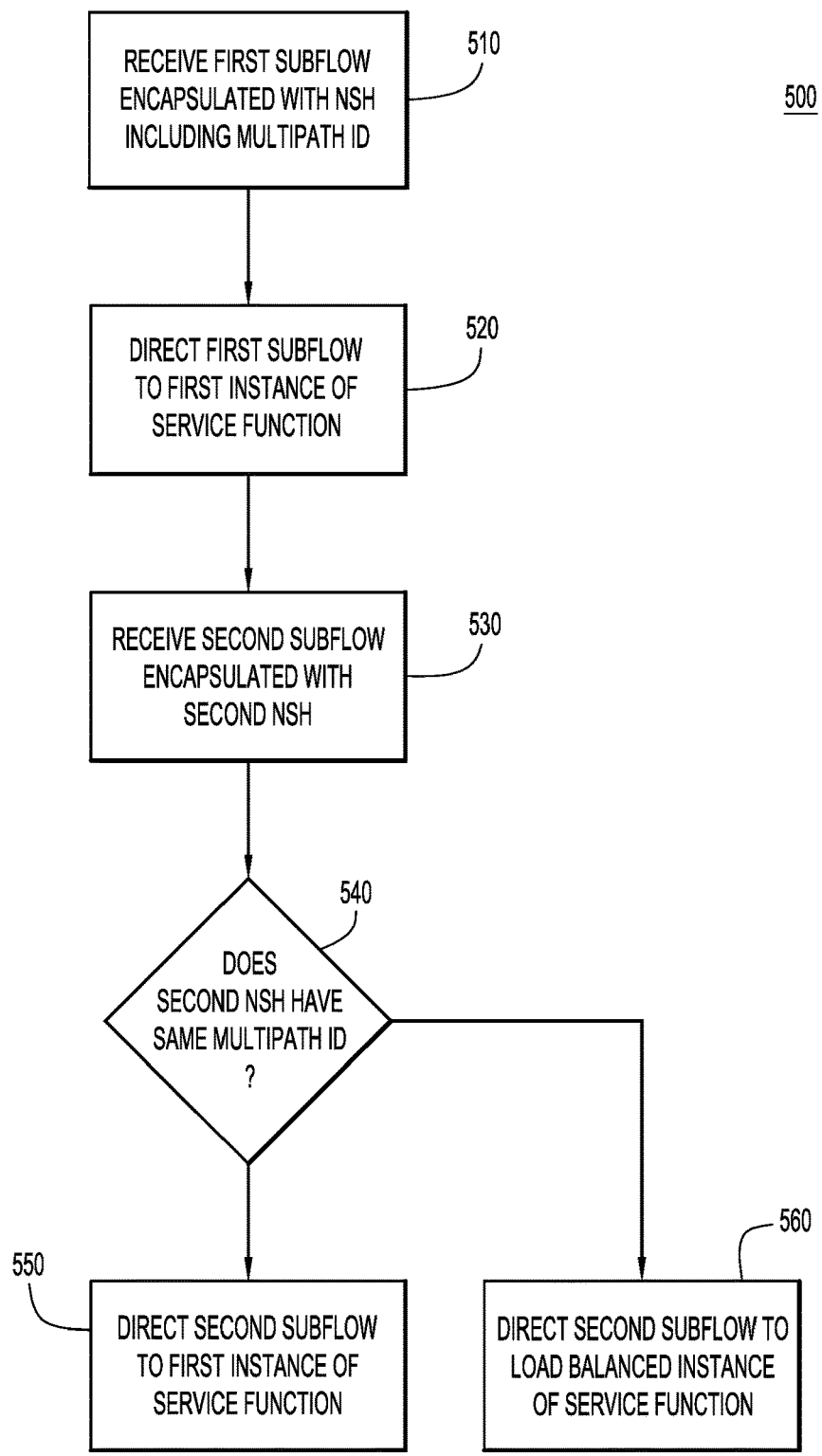
FIG. 5 is a flowchart showing the operations of service function forwarding network device processing subflows of a multipath data flow according to example embodiments.

Referring now to FIG. 5, a flowchart is shown for a process 500 in which a network element (e.g., Service Function Forwarder 160) processes subflows that belong to the same multipath data flow. In step 510, the Service Function Forwarder 160 receives a first subflow that is encapsulated with a Network Service Header including metadata with a multipath flow identifier. In one example, the first subflow may be received from the service classifier. Alternatively, the first subflow may be received from other network elements (e.g., earlier Service Function Forwarder nodes in the Service Function Path). In step 520, the network element directs the first subflow to a first instance of a service function. The network element may perform a load balancing operation with the first subflow to determine to which of a plurality of instances of the service function the first subflow will be directed.

In step 530, the network element receives a second subflow that is encapsulated with a Network Service Header including metadata with a multipath flow identifier. If the second subflow is encapsulated with the same multipath flow identifier as the first subflow, as determined in step 540, then the network element directs the second subflow to the first instance of the service function in step 550. In other words, the first subflow and the second subflow are directed to the same instance of the service function since they are encapsulated with the same multipath flow identifier. If the second subflow is encapsulated with a different multipath flow identifier, then the network element performs a load balancing determination and directs the second subflow to a load balanced instance of the service function. The load balanced instance of the service function may the same instance or a different instance of the service function if the multipath flow identifiers in the Network Service Headers are different.

In summary, the techniques described herein provide for the use of multipath (e.g., MPTCP, MPRTP, etc.) related metadata conveyed in a Network Service Header. The multipath metadata enables the Service Function Forwarders to load balance multipath traffic such that subflows associated with the same multipath connection are directed to the same instance of a service function. If there are multiple Service Function Forwarders in a Service Function Chain domain, with each Service Function Forwarder responsible for load balancing traffic to its designated multiple instance service functions, then the multipath related metadata conveyed in the Network Service Header may be used by each Service Function Forwarder in the Service Function Path to correlate subflows associated with a multipath connection. Additionally, the Service Function Forwarder can forward the subflows associated with a multipath connection to the same instance of a service function without acting as a TLS proxy.

In one form, the techniques presented herein provide for a computer-implemented method performed at a classifier network device, the method including receiving a first subflow among a plurality of subflows and identifying that the first subflow belongs to a multipath data flow. The multipath data flow comprises related data packets sent from a source node to a destination node over a plurality of network paths. The method further comprises generating a multipath flow identifier and encapsulating the first subflow with a first header to produce an encapsulated first subflow. The first header identifies a service function path and includes metadata with the multipath flow identifier.

In another form, the techniques presented herein provide for an apparatus comprising a network interface unit and a processor. The network interface unit is configured to communicate with computing devices over at least one computer network. The processor is configured to receive via the network interface, a first subflow among a plurality of subflow. The processor is also configured to identify that the first subflow belongs to a multipath data flow comprising related data packets sent from a source node to a destination node over a plurality of network paths. The processor is configured to generate a multipath flow identifier and encapsulate the first subflow with a first header to produce an encapsulated first subflow. The first header identifies a service function path and includes metadata with the multipath flow identifier.

In still another form, the techniques presented herein provide for one or more non-transitory computer readable storage media with computer executable instructions to cause a processor to receive a first subflow among a plurality of subflow and identify that the first subflow belongs to a multipath data flow comprising related data packets sent from a source node to a destination node over a plurality of network paths. The instruction cause the processor to generate a multipath flow identifier and encapsulate the first subflow with a first header to produce an encapsulated first subflow. The first header identifies a service function path and includes metadata with the multipath flow identifier.

In another form, the techniques presented herein provide for a computer-implemented method performed at a network element along a service function path, the method including receiving a first encapsulated subflow comprising first subflow in a multipath data flow between a source node and a destination node. The first subflow is encapsulated with a first network service header including a multipath flow identifier associated with the multipath data flow. The method further comprises directing the first subflow to a first instance of a service function among a plurality of instances of the service function. The network node receives a second encapsulated subflow comprising a second subflow encapsulated with a second network service header. The network node determines whether the second network service header includes the multipath flow identifier. Responsive to a determination that the second network service header includes the multipath flow identifier, the network node directs the second subflow to the first instance of the service function.

In yet another form, the techniques presented herein provide for an apparatus comprising a network interface unit and a processor. The network interface unit communicates with network elements and service functions in a service function path. The processor receives, via the network interface unit, a first encapsulated subflow comprising first subflow in a multipath data flow between a source node and a destination node. The first subflow is encapsulated with a first network service header including a multipath flow identifier associated with the multipath data flow. The processor directs the first subflow to a first instance of a service function among a plurality of instances of the service function. The processor receives via the network interface unit, a second encapsulated subflow comprising a second subflow encapsulated with a second network service header. The processor determines whether the second network service header includes the multipath flow identifier. Responsive to a determination that the second network service header includes the multipath flow identifier, the processor directs the second subflow to the first instance of the service function.

In still another form, the techniques presented herein provide for one or more non-transitory computer readable storage media with computer executable instructions to cause a processor to receive a first encapsulated subflow comprising first subflow in a multipath data flow between a source node and a destination node. The first subflow is encapsulated with a first network service header including a multipath flow identifier associated with the multipath data flow. The instructions cause the processor to direct the first subflow to a first instance of a service function among a plurality of instances of the service function. The instruction further cause the processor to receive a second encapsulated subflow comprising a second subflow encapsulated with a second network service header. The instructions cause the processor to determine whether the second network service header includes the multipath flow identifier. Responsive to a determination that the second network service header includes the multipath flow identifier, the instructions cause the processor to direct the second subflow to the first instance of the service function.

The above description is intended by way of example only. Various modifications and structural changes may be made therein without departing from the scope of the concepts described herein and within the scope and range of equivalents of the claims.

What is claimed is:

1. A method comprising:
   receiving a plurality of subflows at a network device;
   identifying that a first subflow among the plurality of subflows belongs to a multipath data flow, the multipath data flow comprising related data packets sent from a source node to a destination node over a plurality of network paths;
   generating a multipath flow identifier;
   encapsulating the first subflow with a first header that identifies a service function path to produce an encapsulated first subflow, the first header comprising metadata that includes the multipath flow identifier;
   identifying that a second subflow among the plurality of subflows belongs to the same multipath data flow; and
   encapsulating the second subflow with a second header that identifies the same service function path to produce an encapsulated second subflow, the second header comprising metadata that includes the same multipath flow identifier.

2. The method of claim 1, further comprising forwarding the encapsulated first subflow to a first service function forwarder in the service function path.

3. The method of claim 1, wherein the multipath data flow comprises a multipath transport control protocol data flow, and wherein identifying that the first subflow belongs to the multipath data flow comprises detecting a cryptographic key in a multipath transport control protocol handshake.

4. The method of claim 3, wherein generating the multipath flow identifier comprises generating a hash of the cryptographic key.

5. The method of claim 1, wherein the multipath data flow comprises a multipath Real-time Transport Protocol (RTP) data flow, and wherein identifying that the first subflow belongs to the multipath data flow comprises detecting a multipath RTP header extension in the first subflow.

6. The method of claim 5, further comprising:
   identifying that the second subflow belongs to the same multipath data flow by detecting a matching username value and synchronization source value in a multipath RTP header extension of the second subflow; and
   encapsulating the second subflow with the second header, the second header comprising metadata that includes the same multipath flow identifier,
   wherein the multipath flow identifier is based on the detected username value and the synchronization source value.

7. The method of claim 2, further comprising forwarding the encapsulated second subflow to the first service function forwarder in the service function path.

8. The method of claim 7, wherein the multipath flow identifier in the first header and the second header enables the first service function forwarder to bypass any load balancing and send the first subflow and the second subflow to a single instance of the service function.

9. An apparatus comprising:
   a network interface configured to communicate with computing devices over at least one computer network;
   a processor configured to:
   receive via the network interface a plurality of subflows;
   identify that a first subflow among the plurality of subflows belongs to a multipath data flow, the multipath data flow comprising related data packets sent from a source node to a destination node over a plurality of network paths;
   generate a multipath flow identifier;
   encapsulate the first subflow with a first header that identifies a service function path to produce an encapsulated first subflow, the first header comprising metadata that includes the multipath flow identifier;
   identify that a second subflow among the plurality of subflows belongs to the same multipath data flow; and
   encapsulate the second subflow with a second header that identifies the same service function path to produce an encapsulated second subflow, the second header comprising metadata that includes the same multipath flow identifier.

10. The apparatus of claim 9, wherein the processor is further configured to forward the encapsulated first subflow via the network interface to a first service function forwarder in the service function path.

11. The apparatus of claim 9, wherein the multipath data flow comprises a multipath transport control protocol data flow, and wherein the processor is configured to identify that the first subflow belongs to the multipath data flow by detecting a cryptographic key in a multipath transport control protocol handshake.

12. The apparatus of claim 11, wherein the processor is configured to generate the multipath flow identifier by generating a hash of the cryptographic key.

13. The apparatus of claim 9, wherein the multipath data flow comprises a multipath Real-time Transport Protocol (RTP) data flow or a multipath RTP Control Protocol (RTCP) data flow, and wherein the processor is configured to identify that the first subflow belongs to the multipath data flow by detecting a multipath RTP header extension or a multipath RTCP header extension in the first subflow.

14. The apparatus of claim 13, wherein the processor is further configured to:
   identify that the second subflow belongs to the same multipath data flow by detecting a matching username value and synchronization source value in the multipath RTP header extension; and
   encapsulate the second subflow with the second header, the second header including metadata that includes the same multipath flow identifier,
   wherein the multipath flow identifier is based on the detected username value and the synchronization source value.

15. A method comprising:
   at a network node along a service function path, receiving a first encapsulated subflow comprising a first subflow in a multipath data flow between a source node and a destination node, the first subflow encapsulated with a first network service header including a multipath flow identifier associated with the multipath data flow;

directing the first subflow to a first instance of a service function among a plurality of instances of the service function;

receiving a second encapsulated subflow comprising a second subflow encapsulated with a second network service header;

determining whether the second network service header includes the same multipath flow identifier; and responsive to a determination that the second network service header includes the same multipath flow identifier, directing the second subflow to the first instance of the service function.

16. The method of claim 15, wherein the multipath data flow comprises a multipath transport control protocol data flow, and wherein the multipath flow identifier is based on a cryptographic key exchanged in a multipath transport control protocol handshake.

17. The method of claim 16, wherein the multipath flow identifier is a hash of the cryptographic key.

18. The method of claim 15, wherein the multipath data flow comprises a multipath Real-time Transport Protocol (RTP) data flow, and wherein the multipath flow identifier is based on a username value and a synchronization source value in a multipath RTP header extension.

19. The method of claim 15, further comprising load balancing a plurality of subflows across the plurality of instances of the service function.

20. The method of claim 19, wherein the plurality of subflows includes the first subflow and the second subflow, and further comprising bypassing the load balancing based on the same multipath flow identifier.

* * * * *